Nov. 22, 1932.   J. J. WHARAM   1,888,708
BRAKE
Filed Oct. 27, 1931   2 Sheets-Sheet 2

INVENTOR.
BY J. J. Wharam
ATTORNEY.

Patented Nov. 22, 1932

1,888,708

UNITED STATES PATENT OFFICE

JOHN J. WHARAM, OF DETROIT, MICHIGAN, ASSIGNOR TO FORD MOTOR COMPANY, OF DEARBORN, MICHIGAN, A CORPORATION OF DELAWARE

BRAKE

Application filed October 27, 1931. Serial No. 571,307.

The object of my invention is to provide a brake having a novel lever for manually actuating the same, which lever will be of simple construction, durable, and inexpensive to manufacture.

Still a further object of my invention is to provide a lever especially suitable for use as an emergency brake lever on a motor vehicle. My improved lever is adapted to be pivoted to the side of the vehicle transmission and is so constructed that a rigid shaft is provided from end to end in the direction moved for actuating the brakes; while a resilient shaft is provided in a transverse direction to prevent engine oscillation due to torsional reaction and torque recoil of the engine, from vibrating the lever.

In all automobile engines with which the applicant is familiar a certain amount of torsional reaction is unavoidable which reaction tends to oscillate the engine around its crankshaft. This reaction causes a very noticeable vibration in engines of from four to six cylinders and even in vehicle engines of eight or more cylinders; where exceptional smoothness is desired, this vibration must be prevented from affecting the body of the car. In order to prevent this transfer of the engine vibration it has become customary to mount the engine resiliently in the frame, that is, by means of spring supports or rubber cushions, to thereby allow the engine a certain freedom of movement independently of the body. Thus, the inertia of the engine absorbs the force of these vibrations before they are transmitted to the vehicle frame. This construction would be an ideal arrangement if it were not for the presence of certain of the control members of the engine in the driver's compartment. These members, namely the gear shift lever and brake lever, have in most cases been attached to the engine and transmission unit so that the oscillation of the engine causes these levers to vibrate with a relatively large amplitude.

The chief purpose of this invention is, therefore, to provide a control lever which is mounted on the engine unit in the conventional manner but which lever is rigid in all planes other than the plane of vibration, and which is flexible in the transverse plane so that the lever will remain stationary by its own inertia even when the engine is oscillating.

My construction is especially suitable for the emergency brake hand lever construction, this lever being pivotally mounted on the transmission and engine unit whereby drawing the lever rearwardly applies the emergency brake. The alleged novel feature of this construction is the means whereby the upper half of the lever is flexibly connected to the lower portion in such manner that oscillation of the transmission and lower portion of the lever does not vibrate the upper part thereof. This flexible connection is so formed that its plane of movement is limited to the plane of engine oscillation so that no flexibility between the parts of the lever is allowed in the plane through which the lever is moved to apply the brake. Thus, a substantial rigid connection resists the normal brake applying stress impressed upon the lever.

Still, a further object of my invention is to provide a brake lever having a longitudinally extending broached opening extending part way therethrough which is adapted to receive a hand operating shaft, this lever being of such shape that a broach may be drawn therethrough without interfering with the unbroached portion of the lever.

With these and other objects in view, my invention consists in the arrangement, construction and combination of the various parts of my improved device, as described in my specification, claimed in my claims, and illustrated in the accompanying drawings, in which:

Figure 3 shows an enlarged sectional view, taken on the line 3—3 of Figure 2.

Figure 1:
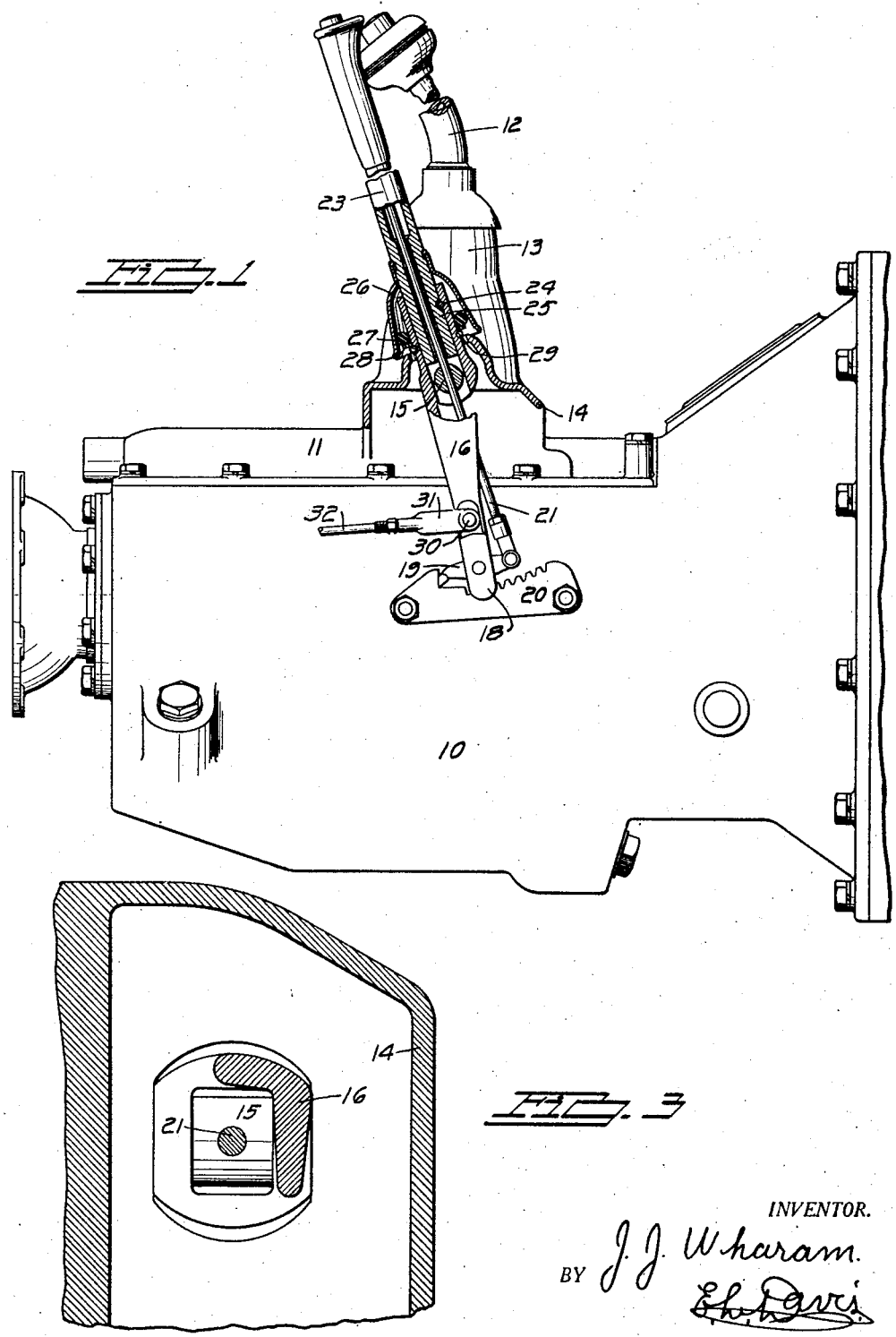
Figure 1 shows a side elevation of an automobile transmission having my improved device mounted thereon, the intermediate portion of which is shown in cross section to better illustrate the construction.
Figure 2:
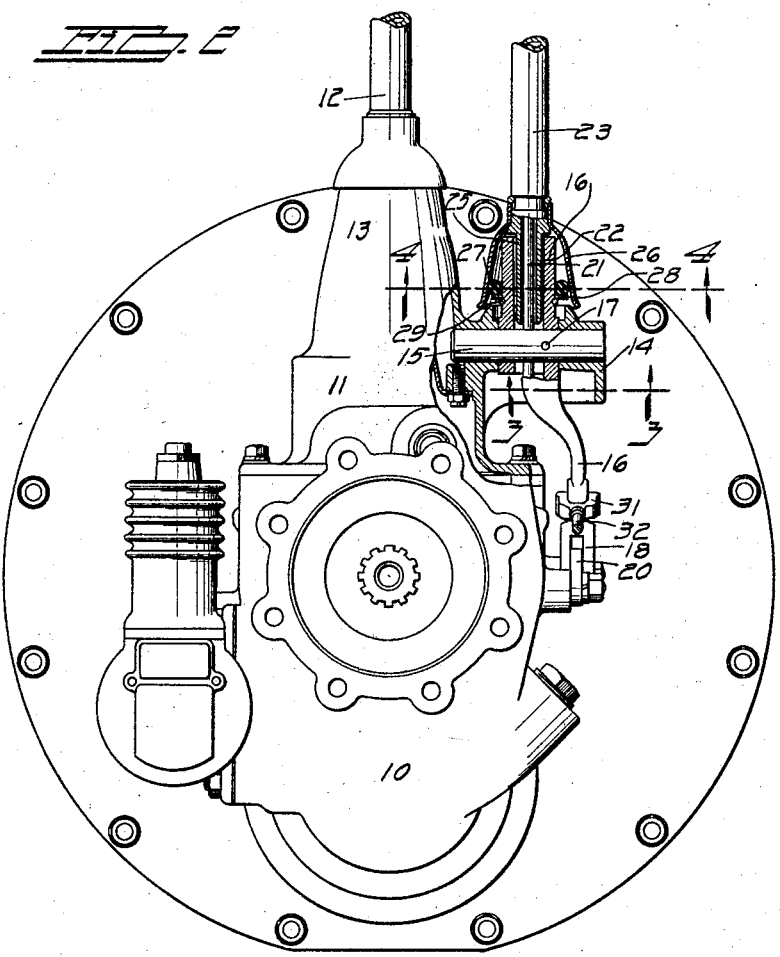
Figure 2 shows a rear view of the transmission shown in Figure 1, my brake operating lever being also shown in section in this view.

Referring to the accompanying drawings, I have used the reference numeral 10 to indicate generally a transmission and clutch housing of the type usually associated with automobile engines. A transmission cover 11 is secured over the upper portion of the housing 10, and a gear shift lever 12 is universally mounted in a tubular support 13 formed integrally with the cover and which extends upwardly therefrom. Cast integrally with one side of the support 13 I have provided a rectangular shaped bracket 14 through which my improved emergency brake operating lever extends and is pivotally mounted. A transverse pin 15 is rotatably secured in the bracket 14 to form a fulcrum for my lever. My lever consists of two parts, the lower portion being an arm 16 which projects through the bracket 14 and through which the pin 15 extends, a dowel pin 17 securing the pin and arm together. The lower end of this arm 16 is provided with a fork 18 in which a pawl 19 is pivotally mounted, one end of this pawl co-acting with a ratchet member 20 which is secured to the side of the transmission housing 10. The other end of the pawl 19 is pivotally connected to a rod 21 which extends upwardly through a suitable opening in the center of the pin 15. That portion of the arm 16 just above the fork 18 is apertured to receive a pin 30 and a clevis 31 which is fastened to the end of an emergency brake operating rod 32, whereby a forward movement of the arm 16 will apply the emergency brakes on the vehicle.

Figure 4:
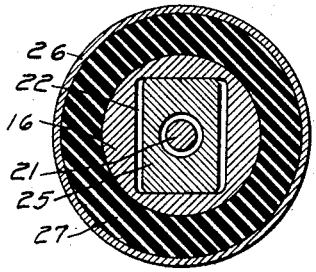
Figure 4 shows a sectional view, taken on the line 4—4 of Figure 2.

It will be noted from Figure 4 that the upper portion of the arm 16 is provided with a rectangular shaped opening 22 extending lengthwise therethrough. In order that such an opening may be conveniently machined by drawing a broach therethrough, the lower portion of the arm 16 is of angle shape, as shown in Figure 3, whereby the broach may be drawn lengthwise through the opening 22 without interference from the lower portion of the arm.

The hand operating portion of my emergency brake lever is comprised of a tubular member 23 having a handle formed on its upper end and having its lower end 25 machined to a rectangular shape which is adapted to fit in the rectangular opening 22. The transverse thickness of this rectangular portion is considerably less than the width of the rectangular opening 22 but the longitudinal dimensions of both the opening and the rectangular portion are substantially the same. Thus, when the member 22 is inserted in the arm 16 a limited lateral movement between the two members is allowed while no longitudinal relative movement is permitted. The handle member 23 after being put in the opening 22 is pivotally secured therein by means of a pin 24. Suitable clearance between the pin 24 and the portion 25 is provided so that the tube 23 may oscillate in a transverse direction in the opening 22.

In order that this assembly may not rattle and that a more pleasing appearance may be given to the device, a bell-shaped shroud 26 is assembled on the tube 23 so as to enclose the upper end of the arm 16. An annular ring of resilient rubber 27 extends around the upper end of the arm 16 so as to closely fit into the shroud 26 and is held in position by means of a washer 28 and snap ring 29. Consequently, when the lever 23 tends to pivot around the pin 15 in a lateral direction the portions of the ring 27 on each side of the arm are alternately compressed so that only a small amplitude of vibration is permitted.

Among the many advantages arising from the use of my improved device it may be well to mention that when the brake is actuated a rigid connection between the portion 23 and the arm 16 is provided so that the stress of applying the brakes is not taken through any resilient connection to thereby make the device as safe and reliable as a solid lever. However, when the engine tends to oscillate around the crankshaft then the upper portion of the lever is permitted a resilient movement relative thereto so that the lever will remain substantially stationary, due to its own inertia.

Some changes may be made in the construction, combination and arrangement of the various parts of my improved device without departing from the spirit of my invention, and it is my intention to cover by my claims such changes as may reasonably be included within the scope thereof.

I claim as my invention:

1. A hand lever construction comprising a pair of longitudinally spaced members one of which is provided with a longitudinal opening adapted to receive the adjacent end of the other member to form a telescopic connection, the elements forming said connection being non-symmetrical whereby clearance between said opening and the sides of said co-acting member is provided, whereby relative movement between the members in a plane transverse to the normal load-applying plane is allowed and a rigid connection between said elements in the normal load-applying plane is provided.

2. A hand lever construction comprising an arm adapted to be pivotally secured to a vehicle transmission housing so as to oscillate in a longitudinal plane, said arm having that portion adjacent to its fulcrum formed with a longitudinally extending rectangular shaped opening therein, and a lever having its adjacent end formed in a rectangular shape which is telescopically fitted into said opening said rectangular end being so proportioned that swinging movement of the lever in a plane transverse to the normal plane of operation is permitted and movement between the arm and lever in the load-applying plane is prevented.

3. A device, as claimed in claim 2, having resilient means disposed between said arm and lever adapted to resiliently restrict said swinging movement.

4. A hand lever construction comprising an arm pivotally mounted to oscillate in the normal load-applying plane, said arm having that portion adjacent to its fulcrum apertured longitudinally to a rectangular shape, a lever having the one end formed to a rectangular shape telescopically fitted into said opening, the dimensions of said opening and lever measured through the normal plane of operation being substantially the same and the dimensions of said opening and lever measured transversely to said plane being materially different, whereby relative movement between the arm and lever in a plane transverse to the normal load-applying plane will be permitted, and resilient means disposed between said members adapted to resiliently restrict said relative movement.

5. In a hand lever construction, an arm having a pin extending transversely therethrough by means of which it is pivotally mounted, said arm having a rectangular shaped opening extending longitudinally through its end adjacent to said pivot, a lever having one end thereof formed to a rectangular shape telescopically fitted into said opening, said end and opening being so proportioned that a rigid connection is provided between said members in a normal load-applying plane and a swinging connection between said members in a plane transverse to said load-applying plane is provided, a ring of resilient rubber disposed around the outside of said apertured end, and a shroud secured to said lever and extending down over said end and ring adapted to closely fit said rubber, whereby transverse movement of said lever is resiliently restricted.

6. A transmission housing having an apertured bracket projecting from one side thereof in which a pin is transversely mounted, an arm extending upwardly through said bracket and secured to said pin so that it may oscillate around said bracket in a fore and aft direction, said arm having a rectangular shaped opening extending from its upper end down through the axis of oscillation, a hand lever having its lower end formed to a rectangular shape telescopically fitted into said opening, the dimensions of said end and opening being substantially the same in the plane of oscillation, and materially different in a plane at right angles thereto, a pin extending through said telescopic connection permitting the lever to swing transversely in said opening, a resilient rubber ring disposed around said telescopic connection, and a shroud secured to said lever and extending down over said ring to thereby resiliently restrict the movement of the lever relative to said arm.

7. A hand lever construction comprising a pair of longitudinally spaced members one of which is provided with a longitudinal opening adapted to receive the adjacent end of the other member to form a telescopic connection, the elements forming said connection being non-symmetrical whereby clearance between said opening and the sides of said co-acting member is provided whereby relative movement between the members in a plane transverse to the normal load applying plane is allowed and a rigid connection between said elements in the normal load applying plane is provided, a resilient ring of rubber disposed around the outside of the outer of said telescopic members, and a shroud secured to the other of said members, said shroud extending down over said resilient ring, whereby transverse relative movement of said telescopic members is resiliently restricted.

October 26, 1931.

JOHN J. WHARAM.